United States Patent [19]

Nagaki

[11] 4,277,808

[45] Jul. 7, 1981

[54] MAGNETIC TRANSDUCER HEAD

[75] Inventor: Takehiro Nagaki, Komae, Japan

[73] Assignee: Sony Corporation, Tokyo, Japan

[21] Appl. No.: 41,439

[22] Filed: May 22, 1979

[30] Foreign Application Priority Data

May 26, 1978 [JP] Japan .................................. 53-62956

[51] Int. Cl.³ ........................... G11B 5/30; G11B 5/12
[52] U.S. Cl. ..................................... 360/113; 360/126; 324/252
[58] Field of Search ................................ 360/112–113, 360/126; 338/32 R; 324/252

[56] References Cited

U.S. PATENT DOCUMENTS

| | | | |
|---|---|---|---|
| 3,860,965 | 1/1975 | Voegeli | 360/113 |
| 3,864,751 | 2/1975 | Beaulieu et al. | 360/113 |
| 3,967,368 | 7/1976 | Brock et al. | 360/113 X |
| 4,012,781 | 3/1977 | Lin | 360/113 |
| 4,021,728 | 5/1977 | Makino et al. | 338/32 R X |
| 4,024,489 | 5/1977 | Bajorek et al. | 338/32 R |
| 4,047,236 | 9/1977 | Lee | 360/113 |

OTHER PUBLICATIONS

IBM/TDB vol. 17, No. 11, Apr. 1975, "Balanced Resistance Magnetoresistive head" by Anderson et al.

Primary Examiner—John H. Wolff
Attorney, Agent, or Firm—Hill, Van Santen, Steadman, Chiara & Simpson

[57] ABSTRACT

A magnetic transducer head having first and second magneto-resistance effect elements, each of which is made of a thin film having the magneto-resistance effect and which are arranged on approximately one line, a current source for flowing currents through the first and second magneto-resistance effect elements, and a bias source for applying bias magnetic fields to the first and second magneto-resistance effect elements. In this case, the bias magnetic field is selected from bias magnetic fields which have the direction of about $\pm(\pi/4)\pm(n/2)\pi$, where n is an integer, with respect to the currents flowing through the first and second magneto-resistance effect elements, and the current source and the bias source are so connected that when a uniform signal magnetic field is applied to the first and second magneto-resistance effect elements, the resistances thereof are varied in the opposite directions with respect to each other and the outputs from the first and second magneto-resistance effect elements are derived differentially.

16 Claims, 31 Drawing Figures

MAGNETIC TRANSDUCER HEAD

BACKGROUND OF THE INVENTION

1. Field of the Invention

The present invention relates generally to a magnetic transducer head, and is directed more particularly to a reproduction magnetic transducer head which utilizes a magneto-resistance effect element whose electrical resistance varies in response to a magnetic field applied thereto.

2. Description of the Prior Art

In the art, it is known that a magneto-resistance effect type magnetic transducer head is high in sensitivity upon a narrow track reproduction, a short-wave reproduction and an extremely low speed reproduction as compared with an ordinary electro-magnetic induction type reproduction magnetic transducer head.

As the magneto-resistance effect type magnetic transducer head, there are proposed various type of heads dependent upon the arrangement of magneto-resistance effect elements (which will be hereinafter referred to simply as MRE elements) and bias applied thereto.

FIG. 1 is a perspective view showing a fundamental example of the MRE type reproduction magnetic transducer head of a so-called perpendicular type which is used to read out the recorded signal on a magnetic record medium such as a magnetic tape 1 in accordance with the magnetic field component in the direction perpendicular to the surface direction of the magnetic layer on the tape 1 which is magnetized. In this case, an MRE element 2 which is formed to be a thin film is located along the width direction of magnetic tape 1 and the film surface of MRE element 2 is located perpendicular to the surface of magnetic tape 1. Terminals 3a and 3b are led out from both ends of MRE element 2, and, for example, a series connection of a DC power source S and a resistor R is inserted between terminals 3a and 3b so as to cause a current I to flow through MRE element 2. Output terminals t are led out from the both ends of resistor R. The magnetic tape 1 is transported in its longitudinal direction as indicated by an arrow a relative to the MRE element 2 and the signal recorded on the magnetic tape 1 is reproduced by the head or MRE element 2 in such a manner that the resistance variation of MRE element 2 caused by the recorded magnetic field (signal) on magnetic tape 2, especially its perpendicular magnetic field component is detected as a voltage variation across the resistor R.

FIG. 2 is a perspective view showing a fundamental construction of a horizontal type MRE reproduction type magnetic transducer head which reads out the recorded signal on the magnetic tape 1 by detecting the magnetic field component in the direction parallel to the surface of the magnetic layer of magnetic tape 1. In FIG. 2, reference numerals and letters which are the same as those in FIG. 1, designate the same elements, and their description will be omitted for the sake of brevity.

In the prior art examples of FIGS. 1 and 2, the MRE element 2 is directly located in the recorded magnetic field of magnetic tape 1. It is, however, possible as shown in FIG. 3, that a magnetic core 4, which is made of a soft magnetic material and has an air gap g at its lower side, is provided and the MRE element 2 is located at an air gap G provided at the upper side of magnetic core 4.

It is also possible that magnetic shield bodies 5 are disposed at both sides of MRE element 2 similar to that of FIG. 1, as shown in FIG. 4.

Further, it is possible to take such a configuration that a bias magnetic field is applied to an MRE element 2. For example, as shown in FIG. 5, an electrically conductive body 6 is located along the MRE element 2 and a current Ib is flowed through the conductive body 6 to generate a bias magnetic field to be of a current bias construction.

It is also possible that, as shown in FIG. 6, a permanent magnet 7 is located in opposed relation to the MRE element 2 to apply a bias magnetic field to the latter.

As set forth above, various constructions of MRE element type reproduction magnetic transducer heads are proposed in the art. However, since the MRE element itself is great in temperature dependency, it is apt to be affected by external circumferential temperature changes such as an external temperature source and hence thermal noise is easily generated. Further, no MRE element which is sufficiently good in linearity is proposed yet.

OBJECTS AND SUMMARY OF THE INVENTION

Accordingly, it is an object of the present invention to provide an improved magnetic transducer head employing an MRE element.

It is another object of the invention to provide an MRE type magnetic transducer head which is superior in linearity.

It is a further object of the invention to provide a magnetic transducer head of the MRE type which is hardly affected by heat.

It is a still further object of the invention to provide a magnetic transducer head of the MRE type which can develop a large output effectively.

According to an aspect of the present invention, there is provided a magnetic transducer head which comprises first and second MRE elements each made of a thin film having magneto-resistance effect and arranged on substantially one line, current means applying a predetermined direction of current to each of the first and second MRE elements, and bias means for applying to the first and second MRE elements a bias magnetic field selected from bias magnetic fields in the direction of about $\pm(\pi/4)\pm(n/2)\pi$ (n is an integer) relative to currents flowing through the first and second MRE elements, the current means for flowing the current through the first and second MRE elements and the magnetic bias applying means being selected such that when a uniform signal magnetic field is applied to the first and second MRE elements, resistances thereof are varied in opposite directions with each other to provide a differential output from the first and second MRE elements.

The other objects, features and advantages of the present invention will become apparent from the following description taken in conjunction with the accompanying drawings in which like reference numerals and letters designate the same elements.

DESCRIPTION OF THE PREFERRED EMBODIMENTS

The present invention will be hereinafter described in detail with reference to FIGS. 7 to 26.

Figure 1:
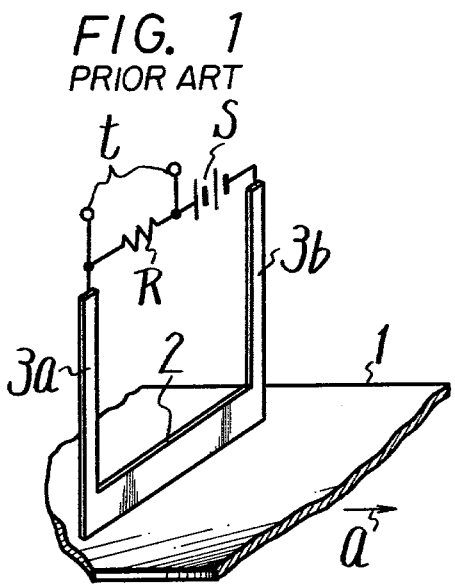
FIGS. 1 to 6 are diagrams respectively showing prior art magnetic transducer heads each using an MRE element.
Figure 2:
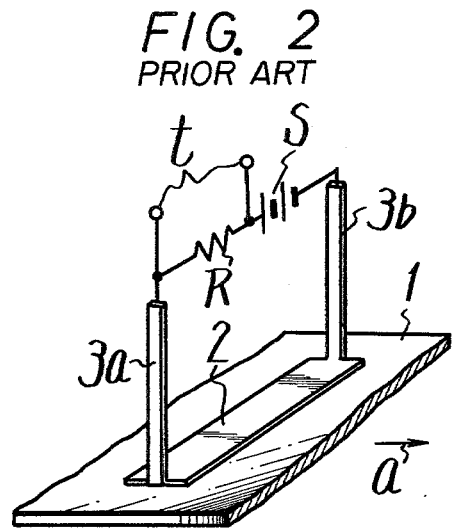
Figure 3:
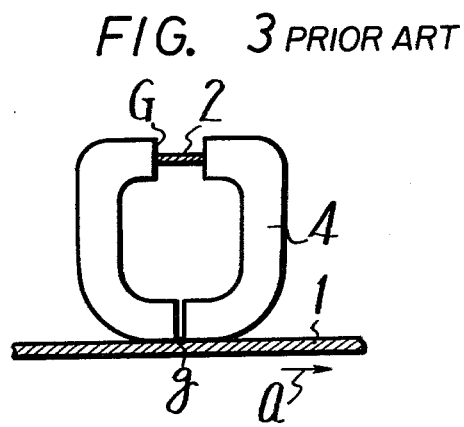
Figure 4:
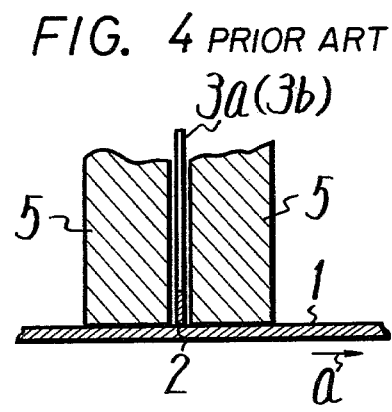
Figure 5:
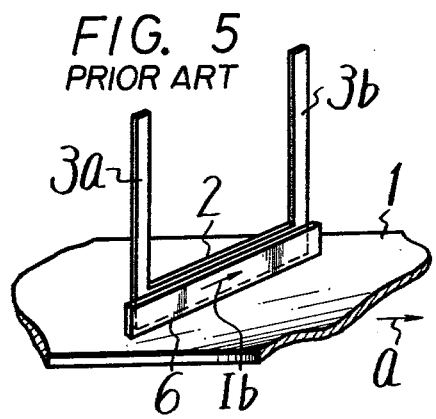
Figure 6:
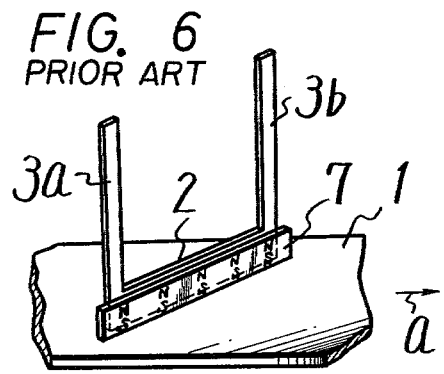
Figure 7A:
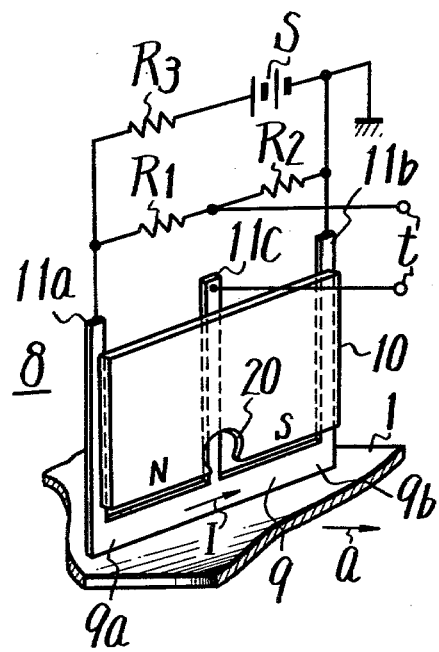
FIGS. 7A and 7B are perspective views showing principal constructions of the magnetic transducer heads using an MRE element according to the present invention.

In FIG. 7A, reference numeral 8 generally designates an example of the magnetic transducer head according to the invention. The example of the invention shown in FIG. 7A, is a so-called perpendicular type MRE reproduction magnetic head which reproduces or reads out a signal recorded on a record medium such as a magnetic tape 1 by using the magnetic field component of the magnetized record in the perpendicular direction with respect to the tape 1.

Figure 7B:
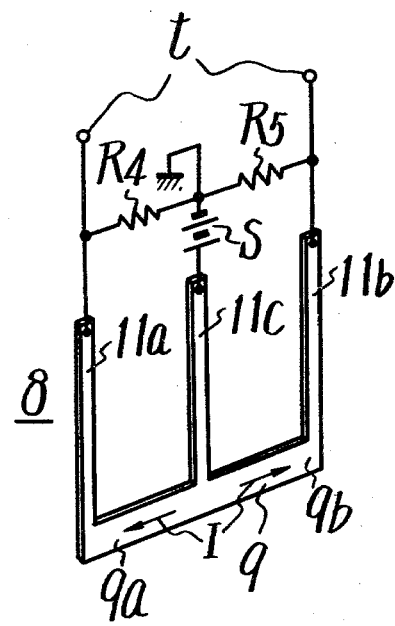

FIGS. 7A and 7B, respectively, show the principal construction of examples of the magnetic transducer head according to the present invention. In the invention, as shown in FIGS. 7A and 7B, an MRE element 9 and a bias generating device 10 are provided to form the head 8. The MRE element 9 is formed of MRE element portions, (In FIG. 7B, the bias generating device 10 is not shown, however, it is provided similar to FIG. 7A) that each have the MRE (magneto-resistance effect) and be made a thin film band, which is electrically connected in series and aligned on one line along the width direction of a record track on the magnetic tape 1. In the examples of FIGS. 7A and 7B, the MRE element 9 is formed of two MRE element portions 9a and 9b of thin band films which are connected together and extended on the width direction of magnetic tape 1. This MRE element 9 is so disposed that, for example, its film surface opposes the magnetic surface of the magnetic tape 1 in substantially perpendicular relation. First and second terminals 11a and 11b are lead upwards from both outer ends of MRE element 9, and a third terminal 11c is extended upwards from the junction point of the two MRE element portions 9a and 9b or from the center of MRE element 9 formed of two MRE element portions 9a and 9b connected integrally in the illustrated examples. In the illustrated examples, however, the terminals 11a, 11b and 11c are formed integral with the MRE element 9 to form an E-shaped element as a whole. In this case, it is so selected that the resistance values of MRE element portions 9a and 9b or between the terminals 11a and 11c and between the terminals 11c and 11b are substantially equal when no signal magnetic field is applied thereto.

In the example of FIG. 7A, a power source, for example, DC voltage source S is connected between the first and second terminals 11a and 11b through a resistor R3 to cause a current I to flow through the MRE element portions 9a and 9b of MRE element 9, and a series connection of resistors R1 and R2 for balancing is connected in parallel to the series connection of DC voltage source S and resistor R3. Output terminals t are led out from the connection point between the resistors R1 and R2 and from the third terminal 11c, respectively, to deliver therefrom an output differentially.

In the example of FIG. 7B, a power source S is connected at its one electrode to the third terminal 11c and at its outer electrode to the other terminals 11a and 11b through resistors R4 and R5, respectively, to flow through the MRE element portions 9a and 9b currents I and −I which are opposite in direction, and an output is derived differentially from output terminals t led out from the terminals 11a and 11b. In this case, it is preferred that the resistors R1 and R2 and resistors R4 and R5 be selected equal in resistance value, respectively, and resistors R3, R4 and R5 maybe selected much larger than MRE elements 9a and 9b in resistance value.

Figure 8:
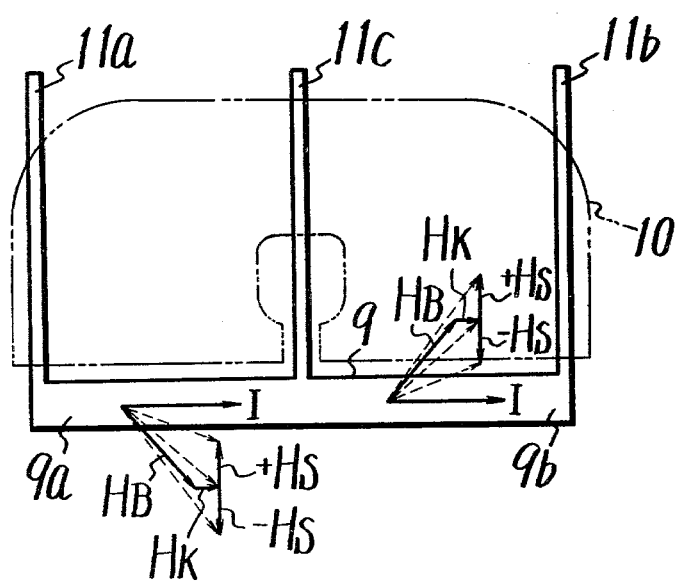
FIG. 8 is a schematic diagram used for explaining the example of the invention shown in FIGS. 7A and 7B.
Figure 9:
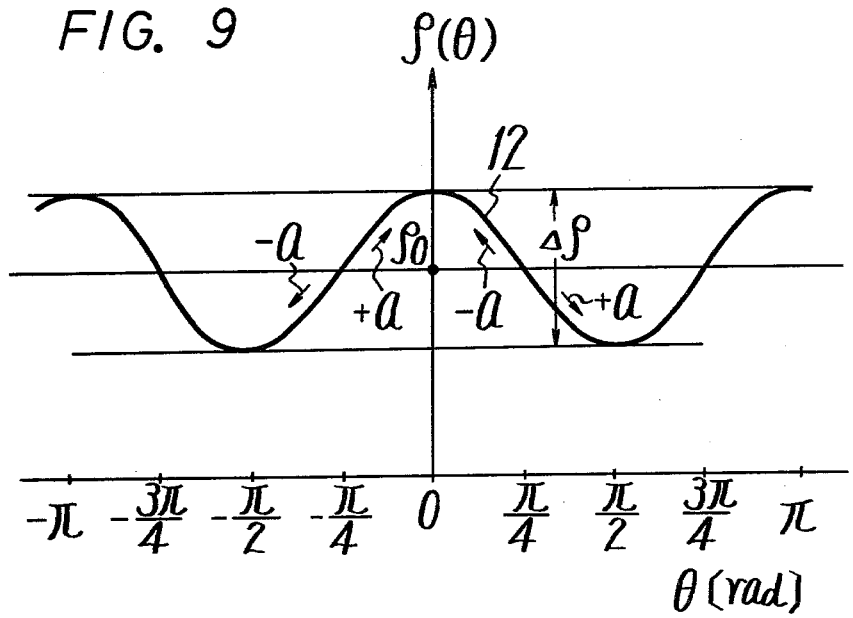
FIG. 9 is a graph showing the relation between the direction of the magnetic field applied to an MRE element with respect to the direction flowing through the MRE element and the resistance thereof.

As the bias magnetic field generating device 10, a permanent magnet or electromagnet can be used. In the examples of FIGS. 7A and 7B, a permanent magnet is used as the bias magnetic field generating device 10, respectively. This bias magnetic field generating device 10 (which is not shown in the example of FIG. 7B) is so disposed for the MRE element 9 that the MRE element portions 9a and 9b of MRE element 9 are given with magnetic fields along their film surfaces and opposite in direction or, for example, the north pole N of magnet 10 opposes the MRE element portion 9a of MRE element 9 between the terminals 11a and 11c and the south pole S of magnet 10 opposes the MRE element portion 9b of MRE element 9 between the terminals 11c and 11b. Thus, the bias magnetic field in the direction of about $(\pi/4)$ with respect to the current I flowing through the MRE element portion 9a between the terminals 11a and 11c is applied to the MRE element portion 9a, while the bias magnetic field in the direction of about $-(\pi/4)$ with respect to the current I flowing through the MRE element portion 9b. In general, the bias magnetic field is different in strength and direction in accordance with the respective parts of MRE element 9 or its position. However, the positional relation between the MRE element 9 and bias magnetic field generating device 10 are so selected that the bias magnetic fields become about $\pm(\pi/4)$ with respect to the current I at any positions of MRE element 9 and the strength of the bias magnetic field are relatively uniform. Under such a state, when signal magnetic fields $\pm H_S$, which are generated by the magnetization of a signal magnetically recorded on the record medium and in the direction perpendicular to the magnetic surface of the record medium, are applied to the MRE element 9 as shown in FIG. 8, the composite magnetic field of the signal magnetic fields $\pm H_S$, bias magnetic field $H_B$ and anisotropic magnetic field $H_K$ is applied to the MRE element 9 as shown in FIG. 8 by the dotted lines.

The reason why the direction of the bias magnetic field with respect to the direction of current is selected to have the angle of about $\pm(\pi/4)$ for the current as set forth above will be now described. The relation between an angle $\theta$ of the direction of the saturation magnetization of MRE element 9 to the direction of the current I flowing through MRE element 9 and a resistance $\rho(\theta)$ of MRE element 9 is well known as the following Viogt-Thomson's equation (1) and designated by 12 in FIG. 9.

$$\rho(\theta) = \rho_0^{\#}\left\{1 + \frac{\alpha^*}{2}\cos 2\theta\,(y,z)\right\}\frac{\Delta z}{t\Delta y} \quad (1)$$

where $\rho_0^{\#}$ represents the inherent resistance of an MRE element under its demagnetization, $\alpha^*$ represents the sensitivity index $$\left(\alpha^* \equiv \Delta\rho/\rho_o,\ \rho_o = \rho^{\#}\frac{\Delta Z}{t\Delta y}\right)$$

of the MRE element, t represents the film thickness of the MRE element, z represents the position of the MRE element in the track width direction, $\Delta z$ is its fine length in the track width direction, and $\Delta y$ is the fine length along the surface direction of the MRE element and perpendicular to $\Delta z$ (refer to FIG. 10), respectively.

From the equation (1), it will be apparent that when the direction of the saturation magnetization or magnetic field applied to the MRE element 9 is varied for the current I within a range of $(\pi/2)$ with $(\pi/4)+(n/2)\pi$ (n is 0 or a positive integer) as the center, the greatest resistance variation $\Delta\rho$ is given. Accordingly, if the bias magnetic fields $H_B$ (which is assumed to be in the same direction as that of the saturation magnetization) are selected for the current I as, for example, $\pm(\pi/4)$ at the left and right positions of MRE element 9 with the terminal 11c as the boundary, respectively, when the signal magnetic fields $\pm H_S$ are applied thereto, $\theta$ is changed in the directions indicated by arrows $+a$ and $-a$ in FIG. 9, with $\pm(\pi/4)$ as the center, and hence the resistances between the terminals 11a and 11c and between the terminals 11c and 11b are changed differentially with the result that the great resistance variation superior in symmetry and linearity can be generated. In this case, it is necessary to consider the anisotropic magnetic field $H_K$ but this anisotropic magnetic field $H_K$ does not affect so much on setting the direction of the bias magnetic field $H_B$ at about $\pm(\pi/4)$.

The above description is given on FIG. 8. However, in order to carry out the similar operation or in order to develop a difference output between two MRE element portions when the resistance of one MRE element portion increases by a signal magnetic field and the resistance of the other MRE element portion decreases by the same signal magnetic field, the other construction can be used by selecting the manner to apply the bias magnetic field and to cause the current to flow.

Figures 26A, 26B:
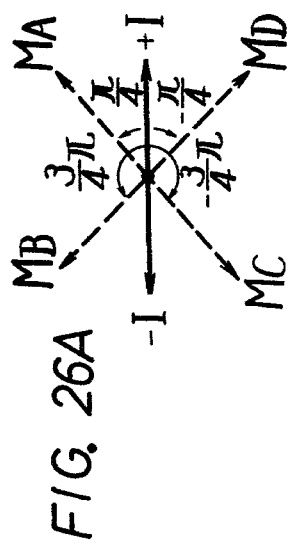
FIGS. 26A and 26B are a phase diagram and a table showing the relation of the current flowing through the magnetic transducer head of the invention and the direction of the bias magnetic field applied thereto.

Now, it is assumed that a current flowing from left to right is taken as $+I$, a current flowing from right to left as $-I$, and the angles of bias magnetic fields applied to an MRE element portion and the current flowing through the MRE element as $+$ in the counter clockwise direction, and $-$ in the clockwise direction with the current as the reference. As may be apparent from FIG. 9, the angles of the bias magnetic field to the current which will cause the maximum resistance variation of each MRE element portion are $\pm(\pi/4)\pm(n/2)\pi$ (where n is 0, 1, 2 ...). Accordingly, in this case, eight combinations can be considered on the currents $+I$ and four direction of magnetization by four bias magnetic fields, i.e., a magnetization MA in the direction of the angle $(\pi/4)$ for the current $+I$, a magnetization MB in the direction of the angle $\frac{3}{4}\pi$ for the current $+I$, a magnetization MC in the direction fo the angle $-\frac{3}{4}\pi$ for the current $+I$, and a magnetization MD in the direction of the angle $-(\pi/4)$ for the current $+I$ (refer to FIG. 26A). In case of the combination of the current $+I$ with the magnetizations MA and MB and the combination of the current $-I$ with the magnetizations MA and MB for the signal magnetic field $+HS$, the resistance of the MRE element portion decreases as may be apparent from FIG. 9, while in case of the combination of the current $+I$ with the magnetizations MC and MD and the combination of the current $-I$ with the magnetizations MC and MD, the resistance of the MRE element portion increases as may be apparent also from FIG. 9. Accordingly, as the MRE element portion pair of the invention which will operate differentially, 16 sets shown in the table of FIG. 26B can be considered. In FIG. 26B, angles between the direction of current and the magnetization are shown in angle, and 45 degrees and 135 degrees correspond to $(\pi/4)$ and $\frac{3}{4}\pi$ radian respectively. In the combinations, the similar operation can be carried out even if the left and right parts are interchanged. The above relations will be summarized as follows. The signs of the currents and bias magnetic fields are considered along the above definition. Then, when the product of the signs of the current and bias magnetic field in each of the MRE element portions, the combinations of MRE element pairs, whose product of the above signs is a different sign, the differential operation can be achieved.

In FIG. 8, since the current flowing through the right MRE element portion 9b is $+I$ and the direction of the bias magnetic field $H_B$ is $+(\pi/4)$, the product of their signs is $+$, while since the current flowing through the left MRE element portion 9a is $+I$ and the direction of the bias magnetic field HB is $-(\pi/4)$, the product of their signs is $-$. That is, the signs of the products are different with each other.

The combinations marked with   in the table of FIG. 26B can be practiced by disposing a bias magnetic field generating device such as the magnet 10 having a center recess 20 shown in FIG. 7A at the same side or opposite side to the MRE element 9 with respect to the magnetic record medium for the magnetic poles of the magnet to correspond to the respective MRE element portions and by selecting the directions of the magnetic poles and currents suitably. The other combinations in FIG. 26B can be also practiced by suitably selecting the mutual position between the magnet and MRE element positions.

Figure 10:
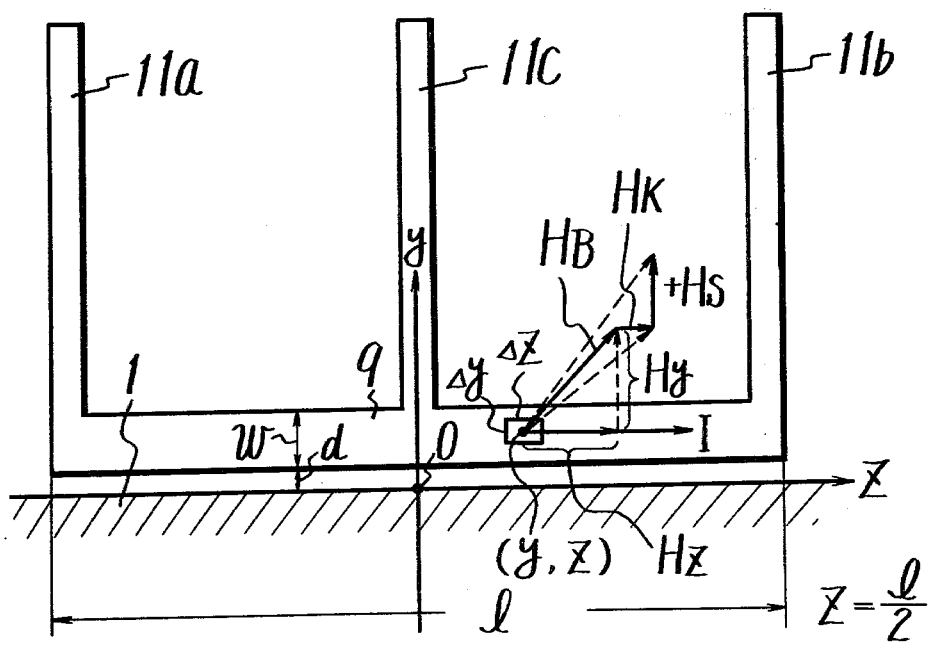
FIG. 10 is a schematic diagram used for explaining the operation of the invention.

Next, the sensitivity of the magnetic transducer head according to the invention will be described. The resistance of MRE element portion 9a or 9b between the terminals 11c and 11a or 11c and 11b can be expressed by the following equation (2) as the total resistance which is obtained by integrating the resistances of the whole fine parts of the MRE element portion 9a or 9b represented by the equation (1).

$$\rho_B = \frac{\rho_0^\#}{\pi} \cdot \frac{1}{\int_{y=d}^{d+w} \frac{dy}{\int_{z=0}^{l/2} \left\{ 1 + \frac{\alpha^*}{2} \cos 2\theta_B(y,z) \right\} dz}} \quad (2)$$

where $\theta_B(y,z)$ is the angle between the direction of the saturation bias magnetic field and the direction of the current I flowing through the MRE element 9, l is the length of MRE element 9, w is the width thereof, and d is the distance between the surface of the record medium and the end portion of MRE element 9 (refer to FIG. 10).

From equation (2), the resistance variation $\rho_{BR+S} - \rho_{BL+S}$, which will pertain to the differential output when the signal magnetic field HS is applied, is expressed by the following equation (3).

$$\rho_{BR+S} - \rho_{BL+S} = \frac{\rho_0^\#}{t} \left[ \frac{1}{\int_{y=d}^{d+w} \frac{dy}{\int_{z=0}^{l/2} \left\{ 1 + \frac{\alpha^*}{2} \cos 2\theta_{BR+S}(y,z) \right\} dz}} - \frac{1}{\int_{y=d}^{d+w} \frac{dy}{\int_{z=-\frac{l}{2}}^{0} \left\{ 1 + \frac{\alpha^*}{2} \cos 2\theta_{BL+S}(y,z) \right\} dz}} \right] \quad (3)$$

where $\theta_{BR+S}(y,z)$ and $\theta_{BL+S}(y,z)$ are the angles between the direction of the current I and the direction of the composite magnetic field of a bias magnetic field $H_{BR}$ applied to the right MRE element portion in FIG. 10 and the signal magnetic field $H_S$, i.e., $H_{BR}+H_S$ and the composite magnetic field of a bias magnetic field $H_{BL}$ applied to the left MRE element portion in FIG. 10 and the signal magnetic field $H_S$, i.e., $H_{BL}+H_S$, respectively. Accordingly, a differential output voltage $\Delta V_{PP}$ (peak to peak value) is expressed by the following equation (4).

$$\Delta V_{PP} = (\sigma_{BR+S} - \rho_{BL+S}) \cdot I \quad (4)$$

where $\rho_{BR}+S$ and $\rho_{BL+S}$ are the resistance variations of the right and left MRE element portions, repsectively.

Similarly, the resistance variation, which will pertain to the differential output, upon the signal magnetic field $-HS$ can be expressed as $$\Delta V_{PP} = (\pi_{BR-S} - \rho_{BL-S}) \cdot I$$

by taking the angles of the composite magnetic fields $H_{BR}-H_S$ and $H_{BL}-H_S$ and the current I as $\theta_{BR-S}(y,z)$ and $\theta_{BL-S}(y,z)$ and substituting them into the equation (3).

Now, the manner to calculate an output from a practical example of the magnetic transducer head with a practical dimension based upon the above equation (4) will be described. If it is assumed that $\Delta\rho/\rho = 5\%$ recorded wavelength, $\lambda = 5$ μm, $d = 0.1$ μm, $w = 5$ μm, $t = 0.05$ μm, $I = 3$ mA, a magnetic tape coated with $CrO_2$ powders is used as the record medium, the bias magnetic field $H_B$ is 100 oe, and the angle between the bias magnetic field $H_B$ and current I is taken as $\pm(\pi/4)$ rad., the reproduced output $\Delta V_{PP}$ developed across the terminals t in FIG. 7 under the track width of 100 μm is about 2 mV.

According to the above example of the present invention, since the third terminal 11c is led out from the center of MRE element 9 and the differential variation of the resistances between the terminals 11a and 11c and between the terminals 11c and 11b is detected, the resistance variations in the same phase by temperature variation and so on are cancelled and hence not detected. Further, the symmetry of the positive and negative signals can be kept.

Figure 11:
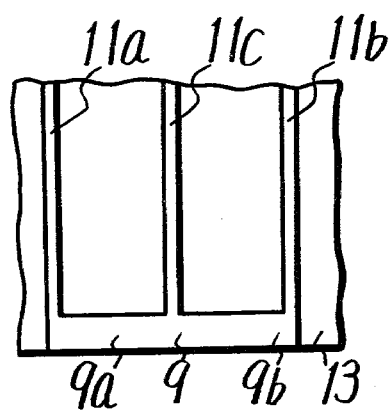
FIGS. 11 and 12 are plan views showing the opposing substrates of an example of the magnetic transducer head according to the present invention.
Figure 12:
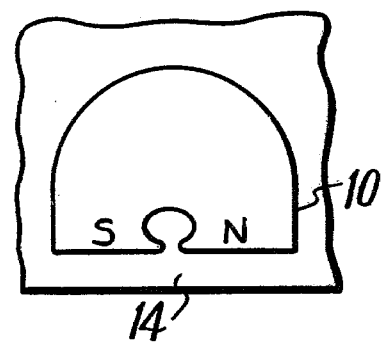
Figure 13:
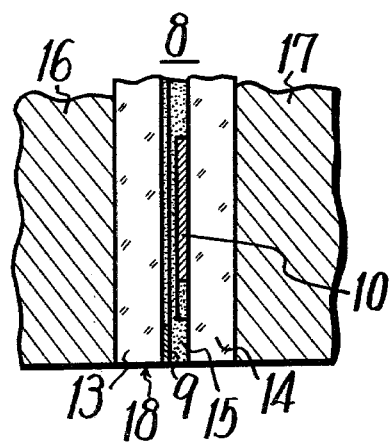
FIG. 13 is a cross-sectional view of the magnetic transducer head of the invention shown in FIGS. 11 and 12.

In order to obtain a magnetic transducer head 8 having the above theoretical construction, the following procedure is carried out. For example, as shown in FIGS. 11 and 12, insulating base plates, i.e., substrates made of glass, ceramics or the like, or two substrates 13 and 14, each of which is made of, for example, a semiconductor such as silicon or conductor coated thereon with an insulating layer, for example, silicon dioxide $SiO_2$ layer are prepared, and a material having MRE (magneto-resistance effect) such as NiCo alloy, permalloy (Ni-Fe alloy) or the like is coated on one substrate, for example, substrate 13 as a thin layer to form an MRE element 9 having two MRE element portions 9a and 9b and respective terminals 11a, 11b and 11c, as shown in FIG. 11. This MRE element 9 and their terminals 11a, 11b and 11c may be formed by, for example, varporizing a material having the above MRE on a substrate with a predetermined pattern, for example, E-shaped pattern or vaporizing the same material all over the surface of a substrate and then removing unnecessary portion of the vaporized layer by, for example, photo-etching. As shown in FIG. 12, to the other substrate 14 there is bonded a magnetic body of high coercive force, for example, a thin plate made of CuNiFe alloy, CuNiCo alloy or the like or a permanent magnet of layer NS-magnetized, i.e., bis magnetic field generating device 10. Then, both the substrates 13 and 14 are bonded together by bonding agent 15 such as epoxy resin, α-cyanoacrylate or the like such that the MRE element 9 and bias magnetic field generating device 10 are faced with each other as shown in FIG. 13. Magnetic shield bodies 16 and 17, each having a high anti-abrasion characteristic, are bonded to the substrates 13 and 14 on their outer sides, respectively. The laminated body of the substrates 13, 14 and magnetic shield bodies 16, 17 thus formed is abraded along the length wise direction of MRE element 9 for the side end surface of MRE element 9 to face the magnetic record medium which is a contact surface 18. Thus, a magnetic transducer head 8 according to the present invention having the theoretical construction described in connection with FIG. 7, can be made.

In this case, various shapes of permanent magnets can be used as the bias magnetic field generating device 10. For example, as shown in FIG. 14, a plate having a rectangular configuration is prepared and it is NS-magnetized along one longer side edge 19, or as shown in FIG. 15, the side edge 19 which is NS-magnetized is cut out to form a recess 20 by which the variation in the strength of the bias magnetic field and angle ($\pm(\pi/4)$) dependent upon the position of the MRE element can be reduced, which will be described later.

Figure 14:
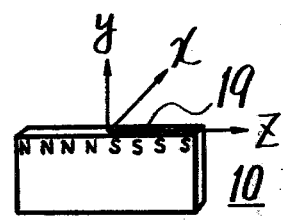
FIGS. 14 and 15 are perspective views showing examples of the permanent magnets which will generate a bias magnetic field applied to an MRE element used in the example shown in FIGS. 11, 12 and 13.
Figure 15:
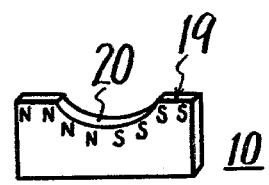
Figures 17A, 17B:
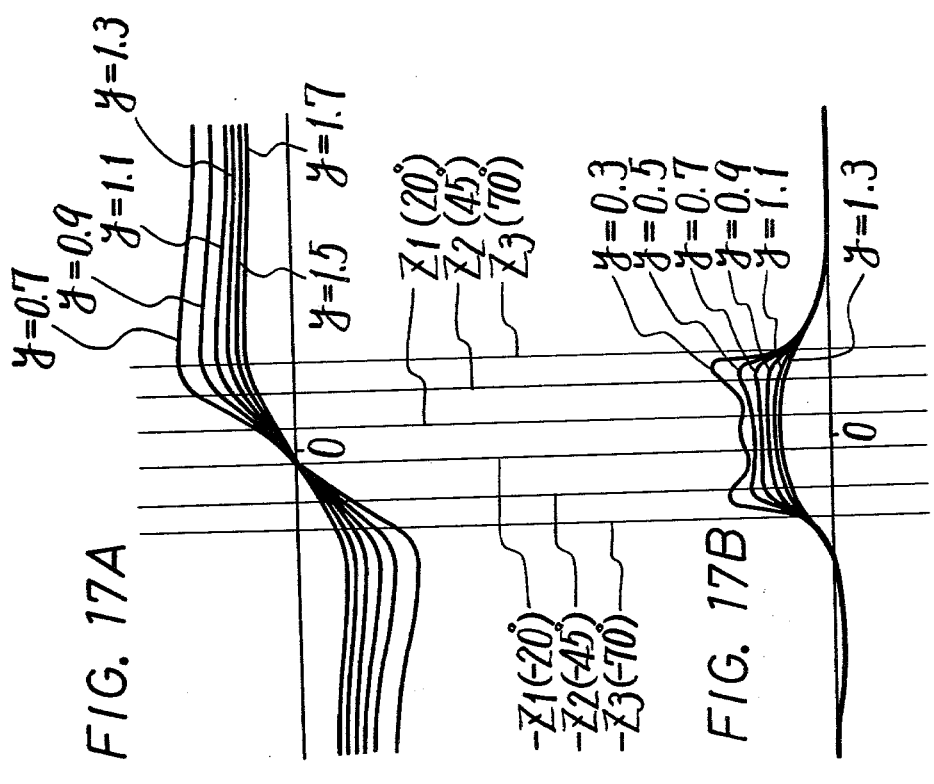
FIGS. 16A, 16B and 17A, 17B are respectively graphs showing magnetic field distributions generated by the magnets in front thereof shown in FIGS. 14 and 15.
Figures 16A, 16B:
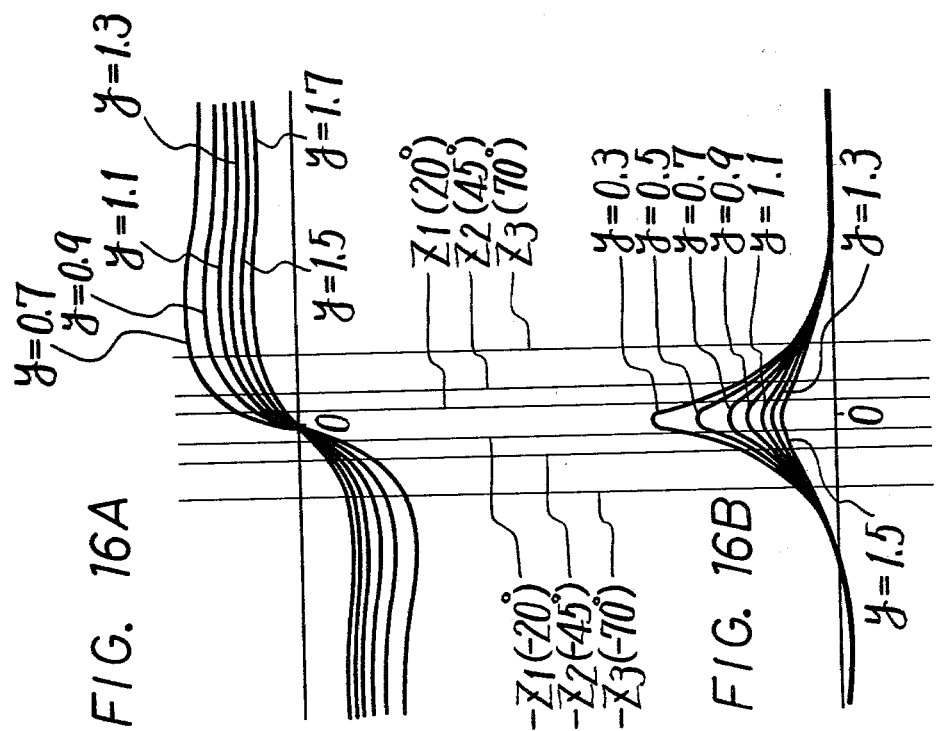

FIG. 16 and 17 are respectively graphs of measured magnetic field distributions by magnets 10 shown in FIGS. 14 and 15 along their longitudinal direction (z-direction) from the center of the end edges 19 in the case of FIG. 14, and the center of the end edge at recessed portion 20 in the case of FIG. 15, of the magnets 10 which is taken as the point 0. FIGS. 16A nd 17A are each the distribution of the magnetic field strength in the direction y perpendicular to the end edge 19, while FIGS. 16B and 17B are each taken in the direction z, respectively. In the respective graphs, the curves show the case where the distance y from the end edge 19 of magnet 10 (relative value) is varied. Further, in FIGS. 16 and 17, Z1, Z2 and Z3 show the positions where the directions of the magnetic fields are 20°, 45° and 70° relative to the axis z, respectively. If the angular range of 20° to 70° is a desired range for the MRE element 0 as the bias magnetic field, where the widths of Z1 to Z3 and $-Z1$ to $-Z3$ are great, a preferred bias magnetic field can be applied to the MRE element 9 over a very wide range. As will be apparent from the comparison of FIGS. 16 and 17, the widths Z1 to Z3 and $-Z1$ to $-Z3$ become wider when the recess 20 is formed on the end edge 19 of magnet 10 than when no recess is formed. As described in connection with FIG. 9, it is desired for the direction of the bias magnetic field of the invention that the bias magnetic field be so applied to the MRE element 9 that the bias magnetic field is $\pm(\pi/4)\pm(n/2)\pi$ for the current I, namely ($\pi/4$), for example, at all the position of MRE element portion 9a of MRe element 9 between the terminals 11a and 11c and $-(\pi/4)$ at all the position of MRE element portion 9b of MRE element 9 between the terminals 11c and 11c. Further, since the strength of the bias magnetic field is uniform at all the positions of MRE element 9 so as to improve the reproduction sensitivity, the end edge 19 of the bias magnetic field generating device 10 is, for example, curved so that the end edge 19 has a taper which goes back to the center of end edge 19. Thus, the bias magnetic field with a gradient of about $\pm(\pi/4)$ can be applied to the MRE element 9 at its respective portions, and also the center portion of device 10 which is high in strength of magnetic field is apart from the MRE element 9 to obtain uniform strength of the magnetic field.

Figure 18:
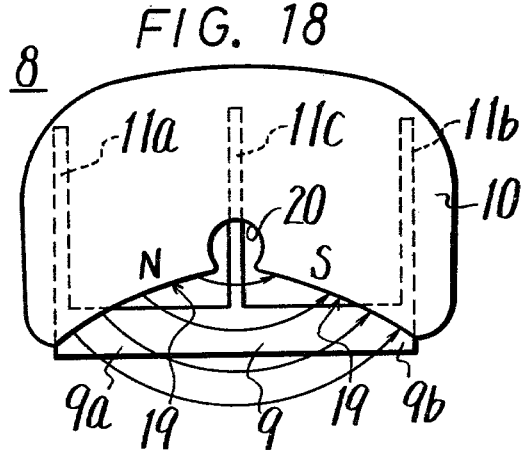
FIGS. 18 and 19 are front and perspective views respectively showing the principal constructions of other examples of the magnetic transducer heads according to the invention.

The recess 20 of permanent magnet 10 near the terminal 11c, shown in FIGS. 7 and 18, can be used to locate a conductor to magnetize the permanent magnet 10, but sometimes is not necessary.

In the above example of the invention, the bias magnetic field generating device 10 is the permanent magnet with NS-magnetization, but can be an electro-magnet.

Figure 19:
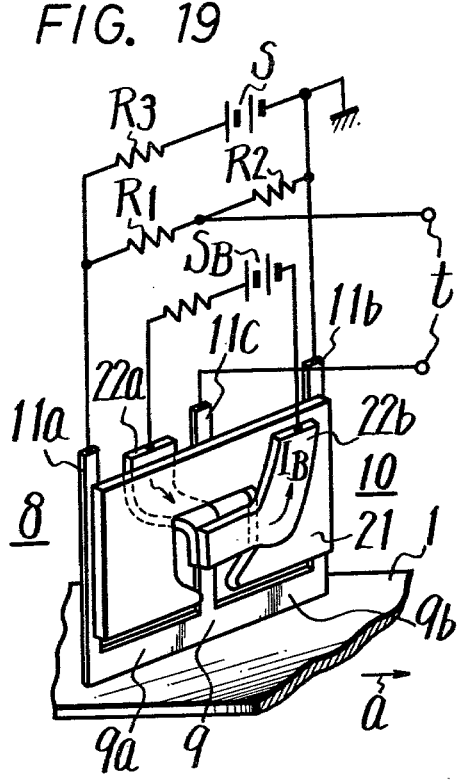

FIG. 19 is a perspective view of another example of the invention in which the bias magnetic field generating device 10 is made of an electro-magnet, in which the parts or elements corresponding to those of FIG. 7 are marked with the same references and the description thereon will be omitted. In the example of FIG. 19, as the device 10, a C-shaped or U-shaped core 21 made of a soft magnetic material is provided, conductors 22a and 22b are located to grip the core 21, and a current $I_B$ flows through conductors 22a 22b from a power supply source $S_B$ to generate a magnetic field by the electro-magnetic induction. In this case, the core 21 is so disposed that both ends of core 21, i.e., both magnetic poles oppose the MRE element portions 9a and 9b of MRE element 9, respectively, and also grip the third or mid terminal 11c of MRE element 9.

Figure 20:
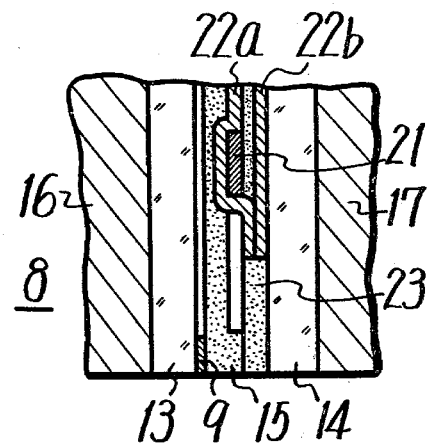
FIG. 20 is a cross-sectional view of the magnetic transducer head shown in FIG. 19.

In order to realize the magnetic transducer head 8 shown in FIG. 19, and as shown in FIG. 10, two substrates 13 and 14 are prepared, the MRE element 9 is formed on one substrate 13 similar to FIG. 11, one conductor 22b is formed on the other substrate 14 by vaporization with a desired pattern, then resin 23 is coated on the substrate 14 with one part of conductor 22b being exposed but with the remaining part of conductor 22b being covered by the resin 23. The soft magnetic core 21 is bonded to the resin layer 23, and then the other conductor 22a is coated thereon, for example, by vaporization with a desired pattern. In this case, one end of conductor 22a is connected to the part of conductor 22b which part is not covered by resin 23 but is exposed. Then, both the substrates 13 and 14 are bonded by the bonding agent 15 with the necessary positional relation therebetween being kept. In FIG. 20, the parts corresponding to those of FIG. 13 are marked with the same reference numerals and their description will be omitted.

In the examples of the invention shown in FIGS. 7 and 19, the resistors R1 and R2 for obtaining the differential output are connected as external resistors. However, in some cases it is possible that the resistors R1 and R2 can be formed of MRE elements.

Figure 21:
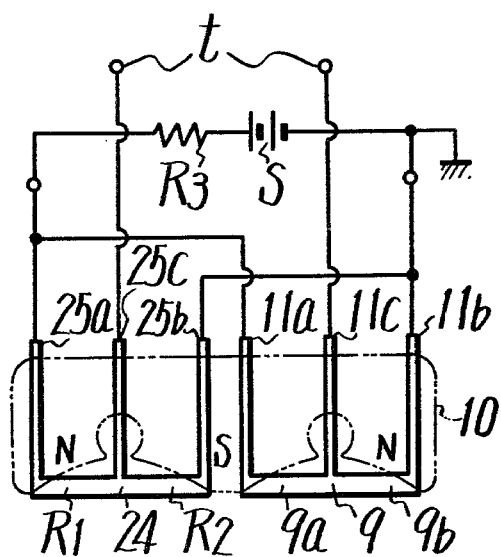
FIGS. 21 to 25, inclusive, are diagrams respectively showing the constructions of other examples of the magnetic transducer heads according to the invention.

FIG. 21 shows one example of such a case. In FIG. 21, the resistors R1 and R2 are formed of an MRE element 24. In this case, first to third terminals 25a, 25b and 25c are led out from both ends and the center of MRE element 24, respectively, and the resistors R1 and R2 are formed by the portions of MRE element 24 between the terminals 25a and 25c and the terminals 25c and 25b, respectively. In FIG. 21, the parts corresponding to those of FIG. 7 are marked with the same references and their description will be omitted.

With the example of FIG. 21, when four MRE element portions R1, R2, 9a and 9b of MRe elements 24 and 9 are subjected to the signal magnetic field +HS uniformly, the resistance of MRE element portion 9b and resistor R1 increase but those of MRE element portion 9a and resistor R2 decrease. Accordingly, at this time, the potential at the connection point between resistors R1 and R2 becomes low but the potential at the connection point between MRE element portions 9a and 9b becomes high. Thus, a large output can be derived from the example of the invention shown in FIG. 21.

Figure 22:
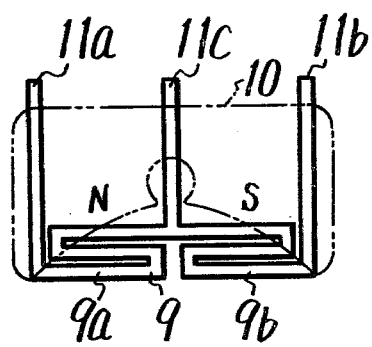

The reproduction sensitivity by the MRE element 9 becomes higher as its MRE element portions 9a and 9b are longer. Therefore, it is possible to fold the MRE element portions 9a and 9b, as shown in FIG. 22, to substantially elongate their length. In this case, the folded portion can be made such that the film surface of MRE element 9 is overlapped.

Figure 23A:
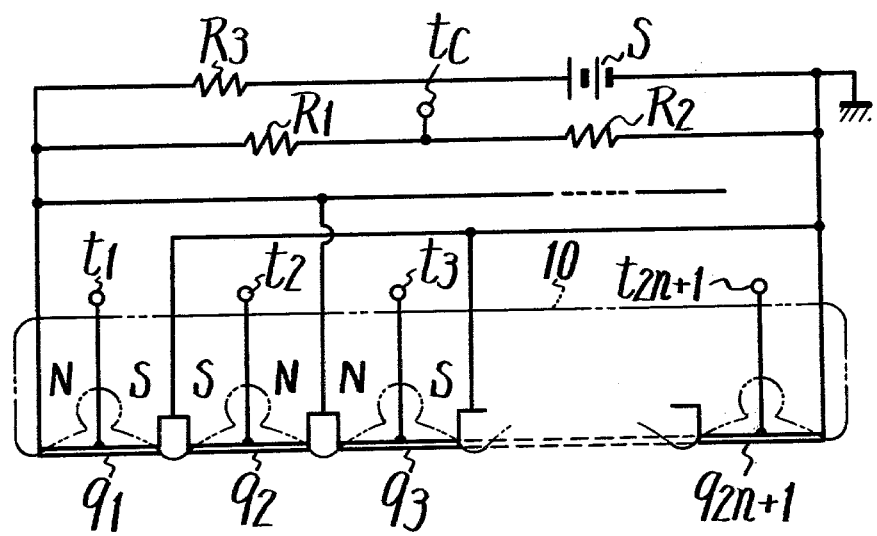
Figure 23B:
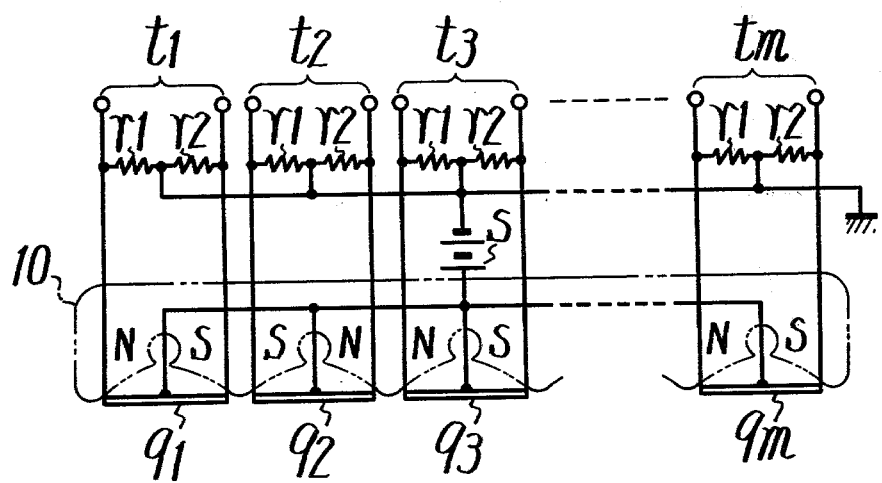

FIGS. 23A and 23B show examples in which the present invention is applied to magnetic transducer heads of the multi-channel type which are used to read out the signals from a plurality of magnetic record tracks. In the example of FIG. 23A, a plurality of MRE elements $9_1$, $9_2$, $9_3$—, each of which has a construction the same as that of MRE element 9 described above, are arranged so that a common output terminal $t_c$ is led out from the connection point between the resistors R1 and R2, and output terminals $t_1$, $t_2$, $t_3$,—are led out from the mid or third terminal $t_c$ of each of MRE elements $9_1$, $9_2$, $9_3$—respectively. FIG. 23B shows an example in which the example of the invention shown in FIG. 7B is applied to a magnetic transducer head of the multi-channel type. In FIGS. 23A and 23B, the parts or elements corresponding to those of FIGS. 7A and 7B are marked with the same references, and the description thereon will be omitted. In FIG. 23B, balance resistance are shown by $r_1$ and $r_2$ which are corresponding to R4 and R5 of FIG. 7B.

Figure 24:
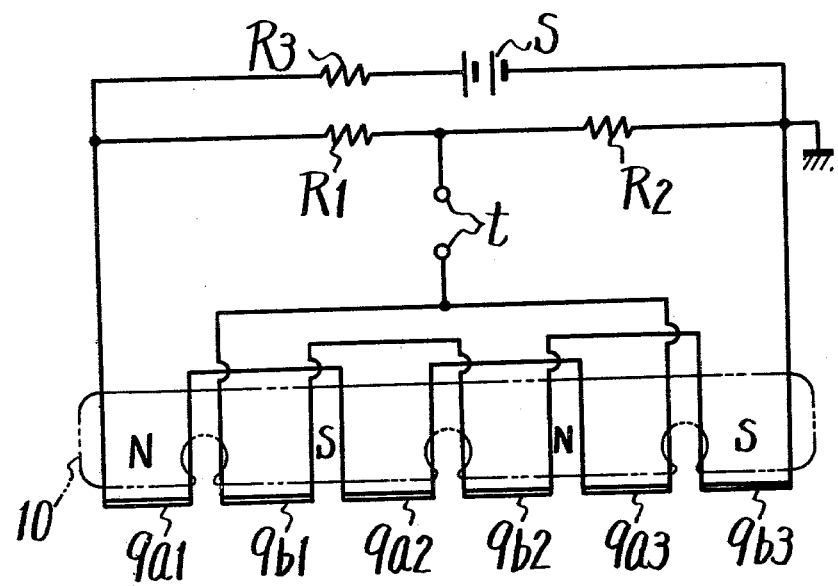

In the above respective examples of the invention, two MRE element portions 9a and 9b are provided for the track of one channel. However, it is possible in the case where the invention is applied to the great track width of one channel that, as shown in FIG. 24, divided MRE element portions 9a1, 9a2, 9a3, 9b1, 9b2 and 9b3 are arranged in the order of 9a1 - 9b1 - 9a2 - 9b2 - 9a3 - 9b3. Thus, a common magnetic pole can be disposed for adjacent MRE element portions to make the bias magnetic field generating device 10 simple in construction. In the example of FIG. 24, three pairs of the MRE element portions are used, but is, of course, possible to increase the number of MRE element portion pairs, if needed.

In the above examples of the invention, the MRE element 9 is subjected to the signal magnetic field directly, but it is also possible that the MRE element 9 be disposed within the magnetic path of a core made of soft magnetic material for the MRE element to be applied with the signal magnetic field indirectly.

Figure 25:
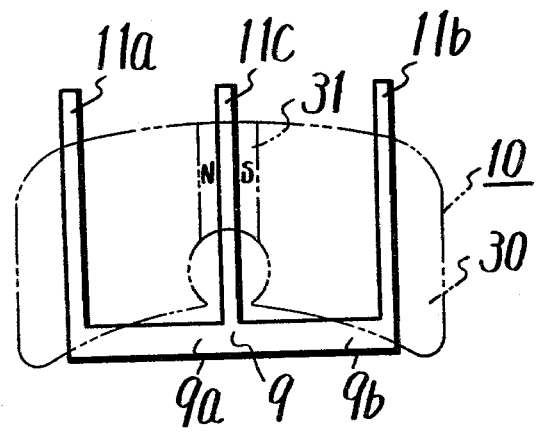

Also, the bias magnetic field generating device 10 can be modified further in addition to the above examples. For example, as shown in FIG. 25, a core 30 is made of soft magnetic material and a magnet 31, which is magnetized, is prepared on a part of core 30 to provide the bias magnetic field generating device 10.

Although the above examples describe cases where the present invention is applied to the perpendicular type magnetic transducer head, the present invention can be, of course, applied to a longitudinal type magnetic transducer head.

It will be apparent that many modifications and variations could be effected by those skilled in the art without departing from the spirit or scope of the novel concepts of the present invention so that the spirit or scope of the invention should be determined by the appended claims.

I claim as my invention:

1. A magnetic transducer head comprising:
    (a) first and second thin film magneto-resistive elements having a common center tap and adjacently aligned on substantially one line;
    (b) current supply means for flowing a current through said first and second magneto-resistive elements in respective selected directions; and
    (c) bias means for applying a respective bias magnetic field to each of said first and second magneto-resistive elements, each of said bias magnetic fields being selected from a group of bias magnetic fields having respective directions of approximately $\pm(\pi/4)\pm(n/2)\pi$ (n being an integer) with respect to the direction of the current flowing through said first and second magneto-resistive elements;
    said current supply means and said bias means being selected such that when a uniform signal magnetic field is applied to said first and second magneto-resistive elements, the resistances thereof are varied oppositely with respect to each other, whereby the outputs of said first and second magneto-resistive elements are tapped differentially for forming an output signal for said transducer head.

2. A magnetic transducer head according to claim 1 wherein said bias means includes a magnet having two magnetic poles defined by a centrally disposed recess at a lower edge of said magnet, said magnet disposed in a plane parallel to each of said first and second magneto-resistive elements and each of said poles having an upwardly sloping lower edge.

3. A magnetic transducer head comprising; first and second thin film magneto-elements adjacently aligned in substantially one line, and serially connected to each other,
    current supply means for causing a current to flow through said first and second elements in respective selected directions,
    magnetic bias means for applying a respective bias magnetic field to each of said first and second elements, each of said bias magnetic fields having respective directions of approximately $\pm(\pi/4)\pm(n/2)\pi$ (n being an integer) with respect to the direction of said currents flowing through said first and second magneto-resistive elements,
    said current means and said bias means being selected such that when a uniform signal magnetic field is applied to said first and second magneto-resistive elements, the resistances thereof are varied oppositely to each other, and
    means connected to each of said first and second magneto-resistive elements for deriving a differential output based on the oppositely varied resistance thereof.

4. A magnetic transducer head according to claim 3, further comprising a first terminal lead extending from an outer end of said first element, a second terminal lead extending from an outer end of said second element, and a common third terminal lead extending from a connecting point of said first and second elements.

5. A magnetic transducer head according to claim 4, wherein said magnetic bias means comprises a magnet disposed with respect to said first and second elements such that magnetic poles of opposite polarity of said magnet are respectively disposed between said first and third terminals, and said third and second terminals.

6. A magnetic transducer head according to claim 4, wherein said means to derive an output include first and second resistors which form a bridge circuit with said first and second elements.

7. A magnetic transducer head according to claim 6, wherein said current means is a current supply source, series connected said first and second resistors, and series connected said first and second elements being connected parallel to said current source, and two outputs being derived from a junction between said first and second resistor, and a junction between said first and second elements.

8. A multi-channel magnetic transducer head comprising a plurality of magnetic transducer heads according to claim 7, wherein said second terminals of every magnetic transducer head are commonly connected to said current source.

9. A magnetic transducer head according to claim 6, wherein said current means is a current supply source, series connected said first element and said first resistor and series connected said second element and said second resistor being connected parallel to said current source, and an output being derived from a junction between said first element and said first resistor, and a junction between said second element and second resistor.

10. A multi-channel magnetic transducer head comprising a plurality of magnetic transducer heads according to claim 9, wherein said third terminals of every magnetic transducer head are commonly connected to one terminal of said current source, and junctions of said first and second resistors of every magnetic transducer head are connected commonly to another terminal of said current source.

11. A magnetic transducer head according to claim 6, wherein said first and second resistors are made of a thin film having magneto-resistance effect.

12. A magnetic transducer head according to claim 3, wherein said first and second elements are disposed adjacent to a travelling magnetic recording medium.

13. A magnetic transducer head according to claim 3, wherein said elements are formed on an insulating substrate and said magnetic bias means is formed on another insulating substrate, and wherein both are combined with each other.

14. A magnetic transducer head comprising:
first and second thin film magneto-resistive elements, adjacently aligned on substantially one line and having a first terminal lead extending from an outer end of said first element, a second terminal lead extending from an outer end of said second element, and a common third terminal lead extending from a junction of said first and second elements;
current supply means for flowing a current through said first and second magneto-resistive elements in respective selected directions;
bias means for applying a respective bias magnetic field to each of said first and second magneto-resistive elements with each of said bias magnetic fields having a selected direction with respect to said direction of current flows, said bias means including a magnet disposed with respect to said first and second elements such that magnetic poles of opposite polarity of said magnet are respectively disposed between said first and third terminals, and said third and second terminals, said magnet having a recess between said two magnetic poles,
said direction of currents and said direction of magnetic fields being selected such that when a uniform signal magnetic field is applied to said first and second magneto-resistive elements, the resistances thereof are varied oppositely with respect to each other, whereby the outputs of said first and second magneto-resistive elements are tapped differentially for forming an output of said transducer head.

15. A magnetic transducer head according to claim 14, wherein said magnet is a permanent magnet.

16. A magnetic transducer head according to claim 14, wherein said magnet is an electro-magnet.

* * * * *